United States Patent [19]

Galen et al.

[11] Patent Number: 5,683,020

[45] Date of Patent: Nov. 4, 1997

[54] BICYCLE SAFETY FLAG APPARATUS

[75] Inventors: Ralph W. Galen, 2210 Massachusetts Ave., Cambridge, Mass. 02140; John Vanderpoel, Concord, Mass.

[73] Assignee: Ralph W. Galen, Cambridge, Mass.

[21] Appl. No.: 710,967

[22] Filed: Sep. 24, 1996

Related U.S. Application Data

[63] Continuation-in-part of Ser. No. 407,718, Mar. 21, 1995, abandoned.

[51] Int. Cl.[6] .................................................. A45F 3/00
[52] U.S. Cl. ............................ 224/197; 224/660; 224/240
[58] Field of Search ............................... 224/197, 660, 224/662, 676, 240; 116/173, 174, 175

[56] References Cited

U.S. PATENT DOCUMENTS

| | | | |
|---|---|---|---|
| 2,969,899 | 1/1961 | Brooks | 224/151 |
| 5,150,824 | 9/1992 | Alvarez | 224/151 |
| 5,351,867 | 10/1994 | Vest | 224/224 |

*Primary Examiner*—David J. Walczak
*Attorney, Agent, or Firm*—Cesari and McKenna, LLP

[57] ABSTRACT

A flag assembly that is worn by a cyclist consists of a relatively thin plate that rotatably supports a flagpole. A spring that is attached to the plate retains the flagpole in selected vertical, left-of-vertical or right-of-vertical orientations. The spring is preferably formed by a tempered-spring wire that is bent into two vertical legs and a horizontal member with a strategically placed inverted detent that holds the flagpole in the vertical orientation. In the preferred embodiment the assembly is carried by a modified fanny pack, which includes a back pocket that is sized to hold the plate. The cyclist wears the modified fanny pack in a conventional manner and the flag assembly rests against the cyclist's spine, which, in turn, maintains the assembly in proper alignment. In a second embodiment, the apparatus is supported by a belt that is worn around the cyclist's waist.

27 Claims, 3 Drawing Sheets

BICYCLE SAFETY FLAG APPARATUS

This is a continuation-in-part of Ser. No. 08/407,718 filed Mar. 21, 1995, now abandon.

FIELD OF THE INVENTION

This invention relates generally to bicycle safety flags and more specifically to flag assemblies that can be worn by cyclists.

BACKGROUND OF THE INVENTION

Cyclists traveling along the sides of roads are often unseen by approaching traffic. A vehicle may therefore unintentionally drive too close to a bicycle, resulting in the vehicle, the bicycle or both swerving in an attempt to avoid collision. This may force the vehicle into oncoming traffic and/or the bicycle into the path of the vehicle.

Even if the driver of the vehicle sees the bicycle, there may be a problem with clearance between the vehicle and the bicycle. Typically, the driver attempts to give the bicycle what the driver considers to be an adequate path at the side of the road. However, the driver may misjudge the distance between the vehicle and the bicycle or he may fail to adjust the clearance in response to varying road conditions or varying speeds. If the vehicle is traveling relatively fast, for example, it must provide a wider clearance, otherwise the drag produced by the vehicle could knock the bicycle off balance. Similarly, if the shoulder of the road is soft or uneven, the vehicle must provide adequate clearance to allow the bicycle to travel on smoother pavement, closer to the center of the road.

This problem is further complicated by the differing sensitivities of the cyclists. For example, what may be an acceptable clearance for a cyclist who has experience riding in traffic may not be acceptable for a cyclist with little or no experience in traffic. Thus a vehicle traveling at what appears to be a safe distance from the bicycle could cause a problem for the inexperienced cyclist. What is needed is a mechanism that enables a cyclist who is riding along the side of a road to enunciate to approaching vehicles an acceptable clearance between himself and passing vehicle.

Another problem that cyclists face is being seen when approaching and crossing intersecting streets. A vehicle turning onto a street may not see a crossing bicycle, for example, because of shrubbery or vehicles parked along the side of the road. Similarly, off-street bicycle paths may cross intersecting streets, and vehicles driving on these streets may not be aware of approaching bicycles. Accordingly, what is needed is a mechanism that enables a cyclist to be seen by approaching vehicles, when the bicycle is traveling a route that includes intersecting streets.

SUMMARY OF THE INVENTION

The invention is a flag assembly that is worn by a cyclist. The assembly supports a rotatable flagpole that is rotated to a selected orientation. The flagpole also may be extendible so that it can be extended or collapsed to position the flag a desired distance from the cyclist. The flag assembly consists of a relatively thin plate and a connected spring that retains the flagpole in selected vertical, left-of-vertical or right-of-vertical orientations.

In a preferred embodiment, the flagpole is flattened and the spring is formed by a tempered-spring wire that is bent to form two opposing vertical members and a connecting horizontal member. The spring is attached to the plate at the ends of the vertical members. The horizontal member includes a strategically placed inverted indent, to hold the flagpole in the vertical orientation. The vertical members may, but need not, include one or more indents that correspond to desired left-of-vertical or right-of-vertical flagpole orientations.

In a first embodiment, the assembly is carried by a modified fanny pack, which the cyclist wears about his or her waist. The modified fanny pack includes a back pocket that is sized to hold the plate. Two flaps extend from the pocket to the cover of the fanny pack, to secure the plate within the pocket. When the cyclist wears the modified fanny pack the flag assembly rests against the cyclist's spine, which supports the assembly and maintains it in proper alignment.

In a second embodiment, the plate is attached to a belt that is worn about the cyclist's waist.

The flag support assembly is lightweight and does not interfere with the movements of the cyclist or with the ride. The cyclist can easily rotate the flagpole to the vertical, left-of-vertical or right-of-vertical orientation that is most advantageous for the conditions of the road that the cyclist is then traveling. If the flagpole is extendible, the cyclist can extend the flagpole to place a vertically oriented flag at a height that can be seen above surrounding obstacles. When the extendible flagpole is oriented horizontally, the cyclist can collapse or extend the pole, as necessary, to place the flag at a distance that denotes an acceptable clearance for both the cyclist's experience level and the particular route on which the cyclist is then traveling.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
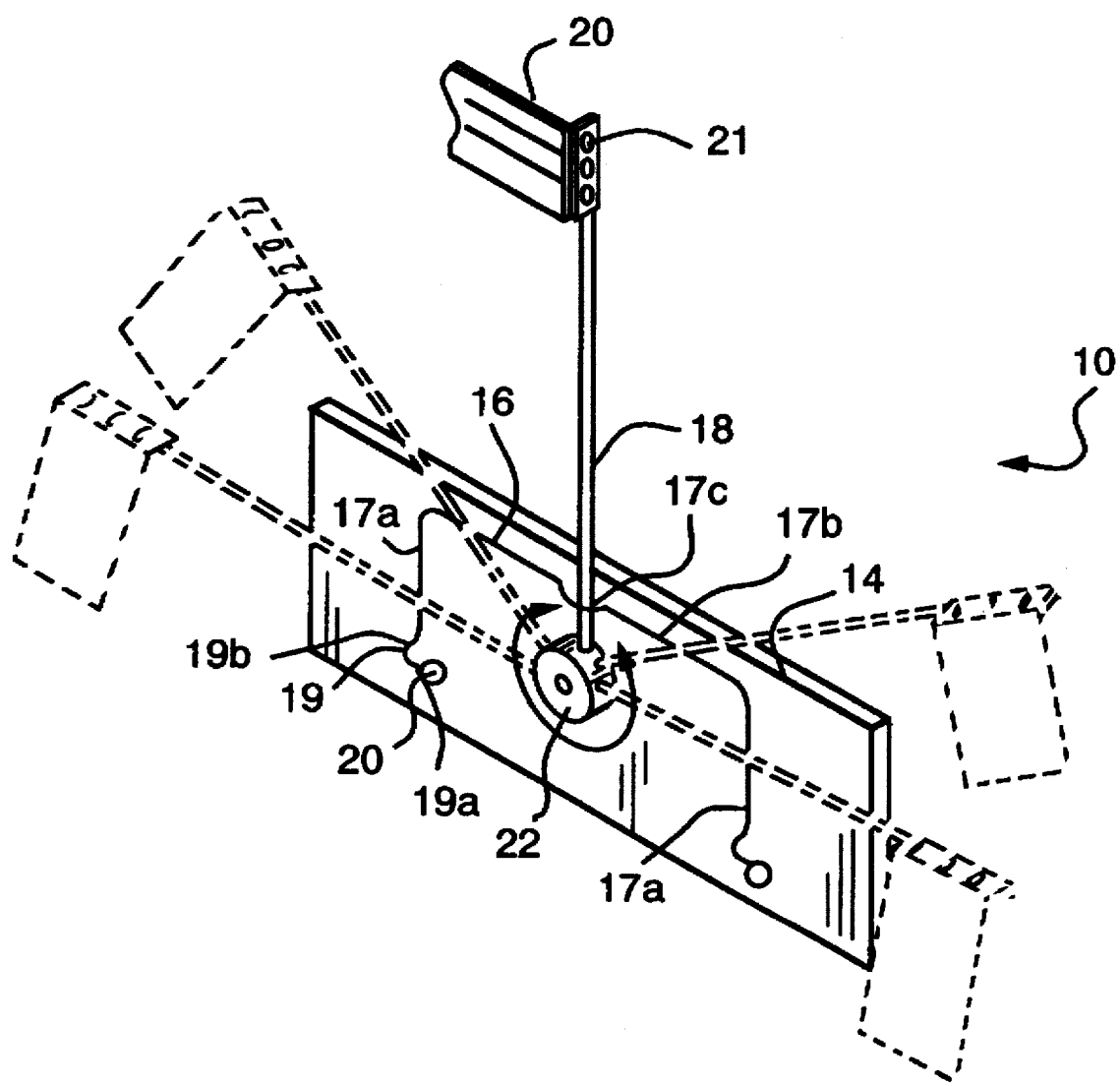
FIG. 1 depicts a flag assembly constructed in accordance with the preferred embodiment.

FIG. 1 depicts a flag assembly 10. The flag assembly consists of a relatively thin plate 14 to which a flattened flagpole 18 and flag 20 are rotatably attached via a pivot 22. The plate 14 also supports a spring 16, which consists of a tempered-spring wire 15 that is bent to form two opposing vertical members, or legs, 17a and a connecting horizontal member 17b. The spring 16 is attached to the plate 14 with screws 20 at the ends 19 of the vertical legs 17a. The horizontal member 17b includes an indent 17c that holds the flattened flagpole 18 in the vertical orientation. The vertical legs 17a of the spring hold the flattened flagpole 18 in a desired orientation that is, to the left or to the right of, vertical. The vertical legs 17a need not include indents, since the tension in the spring holds the flag in the desired left or right of vertical position.

The ends 19 of the vertical legs 17a are shaped such that the legs 17a lay flat against the plate 14. The ends 19 are bent to form at each leg an opening 19a through which the screw 20 extends. The end 19 is further bent to form a raised portion 19b, which holds the remainder of the leg flat against the plate 14.

The flag 20 is mounted on the flagpole 18 with mounting screws 21 that extend from one side of the flagpole 18. When the flagpole 18 is rotated from left-of-vertical to right-of-vertical, the flag is detached from the mounting screws, reversed and again attached to the mounting screws, such that any logo on the flag is displayed appropriately.

Figure 2:
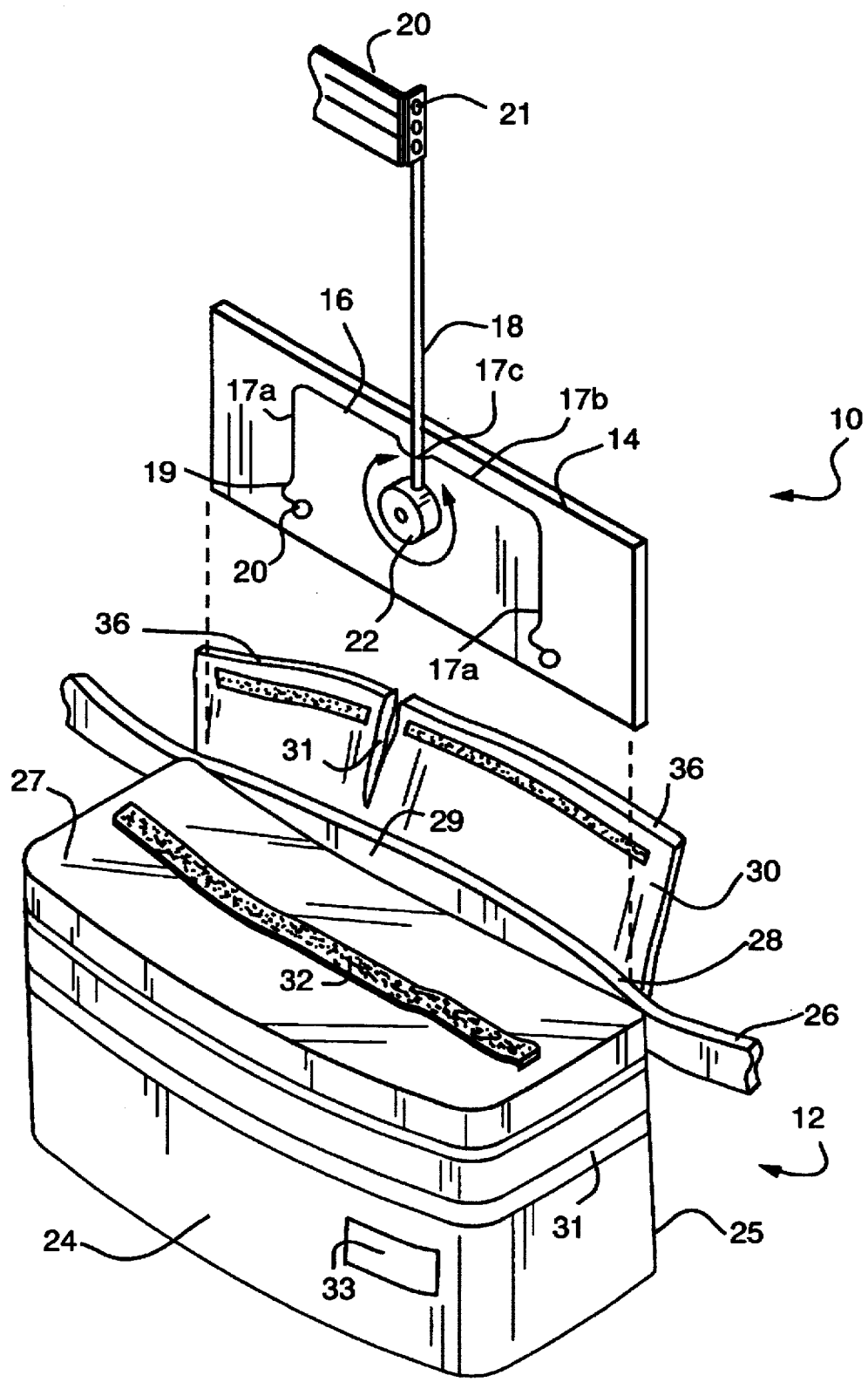
FIG. 2 depicts a first embodiment of the invention, which consists of the flag assembly of FIG. 1 that is carried by a modified fanny pack.

FIG. 2 depicts the flag assembly 10 and a modified fanny pack 12, which receives the flag assembly 10 and allows that assembly to be worn by a cyclist.

The modified fanny pack 12 consists of a bag 24 and straps 26, as are conventional, and a back pocket 28 that attaches to a back wall 25 of the bag 24 and is sized to hold the plate 14. Two flaps 30, which are separated to leave room for the flagpole 18, are attached to a back wall 29 of the pocket 28. These flaps 30 fold over the top of the pocket, to close the pocket and retain the flag support apparatus therein. The flaps 30 attach to one or more self-locking, e.g., "VELCRO," strips 32 on a top wall 27 of the bag 24. Tabs 36 on the ends of each of the flaps 30 allow one or both flaps to be readily lifted away from the strips 32 when the flagpole 18 is to be rotated to or from a near-horizontal orientation. Thereafter, the flap or flaps are closed, to again retain the assembly in the pocket. The flagpole 18 rotates to approximately 30° from the horizontal if the pivot 22 is placed approximately in the center of the plate 14.

Preferably the top wall 27 of the bag 24 is stiffened to provide a hard surface on which to close the flaps 30. This enables a cyclist to close the flaps with one hand, by pressing the tab 36 onto the strips 32. If the top wall 27 is not stiffened, the cyclists needs to use two hands to close the flaps, one hand to support the top wall and the other hand to press the tab.

When the fanny pack 24 is worn by a cyclist, the straps 26 hold the pack in place at the cyclist's waist. The flag support apparatus 10, and in particular the plate 14, is then supported by the cyclist's spine. The plate 14 thus remains essentially parallel to the ground when the cyclist is riding.

The flaps 30 not only retain the support apparatus within the back pocket they, along with the spring 16, also stabilize the flagpole. This reduces vibration and oscillations of the flagpole and the flag that may otherwise annoy the cyclist. The flaps may also support small items, such as lip balm, or a pencil, that are attached thereto by fabric sleeves (not shown).

To re-orient the flagpole 18, the cyclist opens the appropriate flap 30 and pulls the flagpole in the desired direction. When the pole exerts sufficient pressure on the spring 16, the spring stretches slightly and releases the pole from its current position. If the flagpole is in the vertical position, the flagpole is released from the indent 17c in the horizontal member 17b. When the user is no longer exerting a sufficient force on the flagpole, the spring compresses, to hold the pole in place against the plate.

The flagpole 18 does not, in this embodiment, rotate entirely to the horizontal. Instead it remains above the horizontal by approximately 30°, and thus, sticks out of the fanny pack between the top of the pocket 28 and either of the flaps 30. The pivot 22 may be placed nearer to the top of the plate 14, to allow the flagpole to rotate more closely to the horizontal. In addition, the sides of the pocket may be split, so that the flagpole 18 can be rotated fully to the horizontal, and thus, extend between the sides of the pocket and the back wall 25, with the pivot in the center of the plate.

The flagpole 18 is preferably somewhat flexible, so that it can flex when it comes into contact with, for example, the side of a vehicle. This bending prevents the cyclist from being knocked off balance by the contact, and also, prevents the pole from damaging the vehicle.

Figure 3:
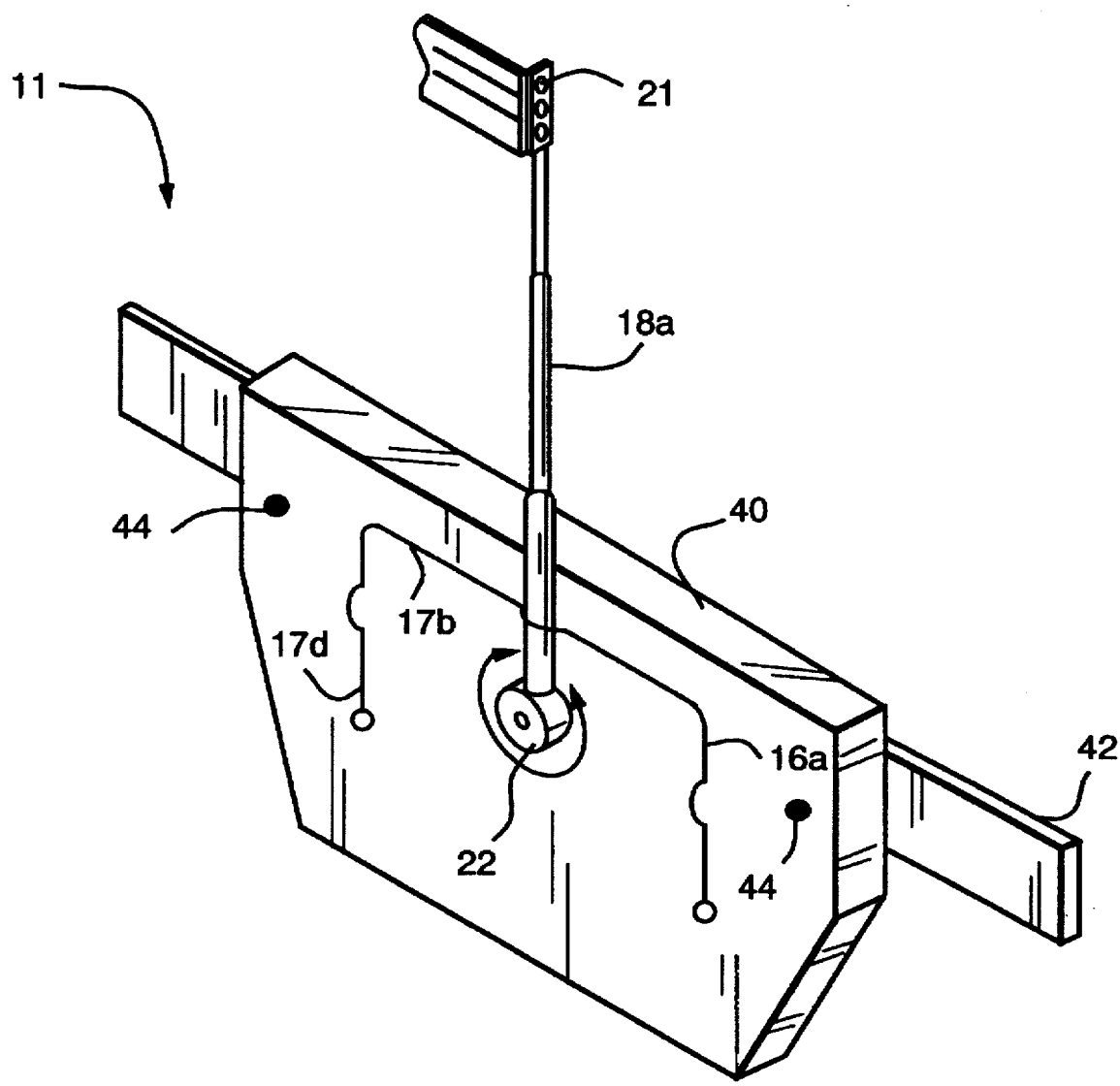
FIG. 3 depicts a second embodiment of the invention, which consists of a rugged flag support apparatus that is carried by a belt.

If the flagpole is extendible as depicted in FIG. 3, the cyclist may, in addition to rotating the flagpole 18, also extend or collapse the flagpole, as desired. When, for example, the cyclist is riding along the edge of a busy road, he may pull the flagpole to a near-horizontal orientation and extend the pole slightly, to position the flag 20 to keep traffic at a safe distance. If the cyclist is riding instead on a bike path that crosses many streets, he may place the flagpole 18 at its vertical orientation and extend the pole to a height that enables the flag 20 to be seen by other cyclists as well as drivers whose vision is obstructed by, for example, shrubbery that lines the bike path.

When the cyclist is no longer on the bicycle, he may collapse the flagpole 18 so that the flag 20 rests essentially on the fanny pack 24. In this position, the flag 20 and pole 18 are out of the way. Alternatively, the cyclist may remove the plate 14 from the pocket 28, after lifting the flaps 30. The cyclist can then wear the bag 24 as a traditional fanny pack.

For further visibility, the fanny pack 24 may include a retro-reflective strip 31 and/or an attached flasher 33. Further, a flasher (not shown) can be attached to the flag 20. The flasher attached to the flag should be removable, so that it can be moved to an appropriate position depending on whether the flag is hanging to the left-of-vertical or to the right-of-vertical.

Referring now to FIG. 3 an alternative embodiment of the invention is shown. The flag assembly 11 includes a tubular telescoping flagpole 18a, which is rotatably attached to a rugged plate 40 via the pivot 22. The plate 40 also supports a spring 16a, which includes vertical legs 17d and a horizontal member 17b, all of which include one or more detents 17c. The spring 16a retains the extendible flagpole 18 in one of an upright, a left-of-vertical or a right-of-vertical orientation. Other mechanisms, such as strategically placed raised guards (not shown), can be used in place of the spring to retain the flagpole in a desired orientation.

The rugged plate 40 is attached directly to a belt 42 via bolts 44. The fanny pack 12 of FIG. 2 is thus eliminated. The plate 40 is relatively heavy—to hold the flagpole 18 in place, without excessive movement and/or twisting. As discussed above, the spring 16 or 16a may be replaced by another mechanism that holds the pole in a desired orientation and, also, supports it against excessive vibration. Further, the belt 42 may extend through the plate 40, such that the plate 40 slides on the belt 42 and can thus be moved, as necessary, to center it on the cyclist's back.

The assembly shown in FIG. 3 operates in the same manner as the assembly of FIG. 1, with the flagpole 18a rotated to a selected vertical, left-of-vertical or right-of-vertical orientation. The flagpole 18a may also be extended or collapsed, as appropriate.

The flagpole support assemblies of FIGS. 1–3 are relatively inexpensive to manufacture. They are comfortable to wear, fitting into or on gear that is typically worn by cyclists. A user wearing one of these assemblies can readily select the flag orientation and, as appropriate, the extension that offer the best protection for a desired route. Further, by wearing the apparatus about his or her waist, the cyclist holds the flag so that it can be readily seen by approaching motorists. If the flagpole was instead mounted on the back of the bicycle, the flag would not be readily seen unless the pole was extended to the cyclist's waist and beyond. Such an extended pole would most likely sway and bounce, and thus, adversely affect the ride. Dismounting is also more difficult if the flagpole is mounted on the bicycle, since the cyclist's foot is obstructed by the pole as the cyclist swings his or her foot over the bicycle seat. The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A flagpole assembly to be worn by a cyclist about the cyclist's waist, the assembly including:
   a. a plate having a first side and a second side;
   b. a flagpole rotatably mounted on the first side of the plate and having a flag thereon, the flagpole rotating to one of a selected vertical, left-of-vertical or right-of-vertical orientation;
   c. a spring for retaining the flagpole in a selected orientation; and
   d. means for supporting the plate about the waist of the cyclist, said means holding the second side of the plate against the back of the cyclist.

2. The flagpole assembly of claim 1 wherein the means for supporting the plate includes a fanny pack with:
   i. a bag with a front wall, a back wall and a top;
   ii. straps extending from the bag, for attaching the bag about the waist of the cyclist;
   iii. a pocket attached to the back wall of the bag, the pocket sized to hold the plate.

3. The flagpole assembly of claim 2 wherein the pocket includes a back wall and flaps that extend from the back wall and attach to the top of the bag to close the pocket and hold the plate in the pocket, the flaps being separated so that the flag in a vertical position stands between the flaps.

4. The flagpole assembly of claim 3 wherein the top is stiffened.

5. The flagpole assembly of claim 1 wherein the means for supporting the plate includes a belt to which the plate attaches.

6. The flagpole assembly of claim 1 wherein the spring includes two opposing vertical legs and a horizontal member that joins the two opposing vertical legs, the ends of the vertical legs being attached to the plate.

7. The flagpole assembly of claim 6 wherein the means for supporting the plate includes a fanny pack with:
   i. a bag with a front wall, a back wall and a top;
   ii. straps extending from the bag, for attaching the bag about the waist of the cyclist;
   iii. a pocket attached to the back wall of the bag, the pocket sized to hold the plate.

8. The flagpole assembly of claim 7 wherein the pocket includes a back wall and flaps that extend from the back wall and attach to the top of the bag to close the pocket and hold the plate in the pocket, the flaps being separated so that the flag in the vertical position stands between the flaps.

9. The flagpole assembly of claim 7 wherein the top is stiffened.

10. The flagpole assembly of claim 7 wherein the flagpole is extendible.

11. The flagpole assembly of claim 1 wherein the flagpole is flattened and includes two opposing sides.

12. The flagpole assembly of claim 11 wherein the horizontal member of the spring includes an inverted indent that retains the flagpole in the vertical orientation.

13. The flagpole assembly of claim 12 wherein each of the vertical legs of the spring includes one or more inverted indents, strategically placed to hold the flagpole in desired orientations.

14. The flagpole assembly of claim 1 wherein the flag is removably attached to the flagpole with mounting screws that extend from one side of the flagpole.

15. A bicycle flagpole assembly including:
   a. a plate having a first side and a second side;
   b. a flagpole rotatably mounted on the plate and having a flag thereon, the flagpole rotating to one of a selected vertical orientation or substantially horizontal orientation;
   c. a detent means for retaining the flagpole in a selected orientation; and
   d. support means for supporting the plate at a height that can be seen by approaching motorists, said support means holding the second side of the plate against the back of the cyclist.

16. The bicycle flagpole assembly of claim 15 wherein the support means includes a fanny pack with:
   i. a bag with a front wall, a back wall and a top;
   ii. straps extending from the bag, for attaching the bag about the waist of the cyclist;
   iii. a pocket attached to the back wall of the bag, the pocket sized to hold the plate.

17. The flagpole assembly of claim 16 wherein the means for supporting the plate includes a belt to which the plate attaches.

18. The bicycle flagpole support assembly of claim 16 wherein the pocket includes a back wall and flaps that extend from the back wall and attaches to the top of the bag to close the pocket and hold the plate in the pocket, the flaps being separated so that the flag in a vertical position stands between the flaps.

19. The bicycle flagpole assembly of claim 15 wherein the support means includes a belt to which the plate attaches.

20. The flagpole assembly of claim 19 wherein the flagpole is flattened.

21. The flagpole assembly of claim 15 wherein the detent means is a spring that includes, two opposing vertical legs and a horizontal member that joins the two opposing vertical legs, the ends of the vertical legs being attached to the plate.

22. The flagpole assembly of claim 21 wherein the horizontal leg of the spring includes an inverted indent that holds the flagpole in the vertical orientation.

23. The flagpole assembly of claim 21 wherein each of the legs of the spring includes one or more inverted indents, strategically placed to hold the flagpole in desired orientations.

24. The flagpole assembly of claim 21 wherein the means for supporting the plate includes a fanny pack with:
   i. a bag with a front wall, a back wall and a top;
   ii. straps extending from the bag, for attaching the bag about the waist of the cyclist;
   iii. a pocket attached to the back wall of the bag, the pocket sized to hold the plate.

25. The flagpole assembly of claim 24 wherein the pocket includes a back wall and flaps that extend from the back wall and attach to the top of the bag to close the pocket and hold the plate in the pocket, flaps being separated and the flag in a vertical position.

26. The flagpole assembly of claim 15 wherein the flag is removably attached to the flagpole with mounting screws that extend from one side of the flag pole.

27. The flagpole assembly of claim 15 wherein the detent means includes raised guards that are strategically placed to hold the flagpole in selected vertical and horizontal orientations.

* * * * *